US011822958B2

United States Patent
Wei

(10) Patent No.: US 11,822,958 B2
(45) Date of Patent: Nov. 21, 2023

(54) METHOD AND A DEVICE FOR DATA TRANSMISSION BETWEEN AN INTERNAL MEMORY OF A SYSTEM-ON-CHIP AND AN EXTERNAL MEMORY

(71) Applicant: Alibaba Group Holding Limited, Grand Cafyman (KY)

(72) Inventor: Shiheng Wei, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 292 days.

(21) Appl. No.: 17/083,857

(22) Filed: Oct. 29, 2020

(65) Prior Publication Data
US 2021/0200582 A1 Jul. 1, 2021

(30) Foreign Application Priority Data
Dec. 26, 2019 (CN) .......................... 201911368047.2

(51) Int. Cl.
*G06F 9/48* (2006.01)
*G06F 13/24* (2006.01)
*G06F 16/901* (2019.01)

(52) U.S. Cl.
CPC ............ *G06F 9/4881* (2013.01); *G06F 13/24* (2013.01); *G06F 16/9024* (2019.01)

(58) Field of Classification Search
CPC ..... G06F 9/4881; G06F 16/9024; G06F 13/24
See application file for complete search history.

(56) References Cited

U.S. PATENT DOCUMENTS

| 5,107,208 A | 4/1992 | Lee |
| 5,701,516 A * | 12/1997 | Cheng ................. G06F 12/0866 711/E12.04 |
| 7,774,512 B2 * | 8/2010 | Suzuoki .................. G06F 13/28 711/146 |
| 8,159,886 B2 | 4/2012 | Miyamoto et al. |

(Continued)

FOREIGN PATENT DOCUMENTS

| JP | 5984989 B2 | 9/2016 |
| JP | 6289029 B2 | 3/2018 |
| KR | 100598097 B1 | 7/2006 |

OTHER PUBLICATIONS

Qui et al., "A Task-Efficient Sink Node Based on Embedded Multi-Core soC for Internet of Things" In: Future Generation Computer Systems. Dec. 17, 2016. <https://research.tees.ac.uk/ws/files/10198372/FGCS_paper.pdf>.

*Primary Examiner* — Wissam Rashid

(57) ABSTRACT

A data transmission method and device for data transmission between an internal memory of a system-on-chip and an external memory coupled to the system-on-chip. The method is executed by a processor of the system-on-chip, including steps of: adding execution information of at least one data transmission task to be executed to a task queue; sending execution information of one data transmission task in the task queue to a direct access device for the direct access device to execute the data transmission task; and receiving an interrupt request sent by the direct access device, where the interrupt request is used to indicate completion of the execution of the data transmission task, so that the processor sends execution information of a next data transmission task to be executed in the task queue to the direct access device.

15 Claims, 12 Drawing Sheets

(56) References Cited

U.S. PATENT DOCUMENTS

| | | |
|---|---|---|
| 8,271,700 B1 | 9/2012 | Annem et al. |
| 8,745,724 B2 | 6/2014 | Kothari |
| 8,908,411 B2 | 12/2014 | Riho |
| 8,964,440 B2 | 2/2015 | Kim |
| 9,053,062 B2 | 6/2015 | Kambayashi |
| 9,070,569 B2 | 6/2015 | Lee |
| 9,134,779 B2 | 9/2015 | Kuesel et al. |
| 9,182,925 B2 | 11/2015 | Thayer |
| 9,183,892 B2 | 11/2015 | Oh et al. |
| 9,252,081 B2 | 2/2016 | Ide |
| 9,318,156 B2 | 4/2016 | Kanapathippillai |
| 9,679,664 B2 | 6/2017 | Ong |
| 10,147,479 B2 | 12/2018 | Matsui |
| 10,318,195 B2 | 6/2019 | Takemae |
| 2001/0040580 A1 | 11/2001 | Margulis |
| 2003/0172257 A1 | 9/2003 | Greenblat et al. |
| 2005/0114616 A1 | 5/2005 | Tune et al. |
| 2010/0191911 A1 | 7/2010 | Heddes et al. |
| 2010/0191913 A1* | 7/2010 | Chlipala ............. G06F 12/0866 711/E12.017 |
| 2010/0293353 A1 | 11/2010 | Sonnier et al. |

\* cited by examiner

| Internal memory | block1 | block2 | block3 | block4 |
| --- | --- | --- | --- | --- |
| t0 | data1 | null | null | null |
| t1 | data1' | data2 | null | null |
| t2 | data1' | data2 | data3 | data4 |
| t3 | data1' | data2' | data3 | data4 |
| t4 | data1' | data2' | data3 | data4 |
| t5 | data5 | data2' | data3 | data4 |
| t6 | data5 | data2' | data3' | data4 |
| t7 | data5 | data2' | data3' | data4' |
| t8 | data5 | data6 | data3' | data4' |
| t9 | data5 | data6 | null | data4' |
| t10 | data5' | data6 | null | data4' |
| t11 | data5' | data6 | null | null |
| t12 | data5' | data6' | null | null |
| t13 | null | null | null | null |

METHOD AND A DEVICE FOR DATA TRANSMISSION BETWEEN AN INTERNAL MEMORY OF A SYSTEM-ON-CHIP AND AN EXTERNAL MEMORY

PRIORITY CLAIM

The present application claims priority to China Patent Application No. 201911368047.2 filed Dec. 26, 2019 and titled "DATA TRANSMISSION METHOD AND DEVICE", incorporated herein by reference in its entirety.

TECHNICAL FIELD

The present invention relates to the field of embedded technologies, in particular a method and a device for data transmission between an internal memory of a system-on-chip and an external memory.

BACKGROUND

With the development of network communication technologies, modern society has entered into an era of the Internet of Things. An embedded system-on-chip (SoC) is a system integrated with modules such as a processor, a memory, a peripheral, and an I/O interface, embedded into an Internet of Things device for implementing particular functions. To meet the design requirements for low power consumption and low cost, an internal memory of the system-on-chip usually has a small capacity, and a large amount of data is stored in an external memory coupled to the system-on-chip.

It is fast reading from and writing into the internal memory, which however has a small capacity, while it is slow reading from and writing into the external memory which has a large capacity. In some application scenarios, it is required to implement data transmission between the internal memory and the external memory to balance the read/write speed and the storage capacity. In order to avoid wasting the computing resources due to data transmission implemented by the processor (the processor is unable to execute other computing tasks while in data transmission), a direct memory access (Direct Memory Access, DMA) device is generally disposed in the system-on-chip to implement data transmission between memories. During the process of data transmission by the DMA device, the processor may execute other computing tasks, without having to waste time waiting for completion of the data transmission task in particular. However, the process of data transmission by the DMA device is controlled by the processor. In some cases, the waste of processor resources occurs when it is not a proper time for the processor to start the process of data transmission, even if the DMA device is used for data transmission.

For example, four steps, a to d, are included in a program, where it is required to transmit data from an external memory to an internal memory in steps c and d. As shown in FIG. 1, at the moment t1, the processor sends the data information needed in step c to the DMA device, and then the DMA device starts to transmit the data of step c, while at the same time the processor executes steps a and b in sequence. At the moment t2, the DMA device completes the data transmission and sends an interrupt request to the processor. At the moment t3, the processor sends the data information needed in step d to the DMA device, and then the DMA device starts to transmit the data of step d, while at the same time the processor executes step c. At the moment t4, the execution of step c is completed, but the DMA device has not yet completed the data transmission of step d, so the processor has to wait until the completion of data transmission at the moment t5, and then starts to execute step d.

In this example, the DMA device is in an idle state during the time period of t2 to t3, because the processor does not send the data information needed in step d to the DMA device until the moment t3. The time to transmit the data of step d is postponed, causing that the processor has to wait for the completion of data transmission and is unable to execute a computing task during the time period of t4 to t5, wasting computing resources.

SUMMARY

In view of this, the present invention provides a data transmission method and device in an effort to solve or at least alleviate the above problems.

According to a first aspect of the present invention, a data transmission method is provided, adapted for data transmission between an internal memory of a system-on-chip and an external memory coupled to the system-on-chip. The method is executed by a processor of the system-on-chip, including steps of: adding execution information of at least one data transmission task to be executed to a task queue; sending execution information of one data transmission task in the task queue to a direct access device for the direct access device to execute the data transmission task; and receiving an interrupt request sent by the direct access device. The interrupt request is used to indicate completion of the execution of the data transmission task, so that the processor sends execution information of a next data transmission task to be executed in the task queue to the direct access device.

Optionally, in the data transmission method according to the present invention, the system-on-chip further includes a hardware acceleration unit, the hardware acceleration unit being coupled to the internal memory. The data transmission task includes: transmitting data in the external memory to the internal memory, so that the hardware acceleration unit fetches and processes the data; and transmitting the processed data from the internal memory to the external memory after the hardware acceleration unit has processed the data.

Optionally, in the data transmission method according to the present invention, the execution information includes a source starting address, a destination starting address, and a data size of the data transmission.

Optionally, in the data transmission method according to the present invention, the task queue is a linked list structure, and the step of adding execution information of a data transmission task to be executed to the task queue includes: adding the execution information of the data transmission task to be executed to the tail of the linked list.

Optionally, in the data transmission method according to the present invention, the step of sending execution information of one data transmission task in the task queue to a direct access device includes: writing the execution information of the data transmission task in the task queue to a configuration register of the direct access device.

Optionally, in the data transmission method according to the present invention, the task queue further includes a status flag of each data transmission task, the status flag including not-executed, being-executed, and executed; and the method further includes: setting the status flag of a data transmission task to not-executed after adding execution information of the data transmission task to be executed to the task queue; setting the status flag of a data transmission task to not-executed after adding execution information of the data transmission task to be executed to the task queue; and setting the status flag of the data transmission task to executed after receiving an interrupt request sent from the direct access device for indicating completion of the execution of the data transmission task.

Optionally, the data transmission method according to the present invention further includes a step of: determining whether data in the destination address of the data transmission task is available according to the status flag of the data transmission task.

Optionally, in the data transmission method according to the present invention, the task queue further includes post-work information of each data transmission task, the post-work information containing operations required to be executed after completion of the execution of the data transmission task; and after the step of receiving an interrupt request sent from the direct access device, the method further includes a step of: executing post-work of a respective data transmission task.

Optionally, in the data transmission method according to the present invention, the post-work includes at least one of the following: freeing storage space in the source address, verifying whether data written to the destination address is correct, and verifying whether the direct access device has correctly executed the data transmission task.

According to a second aspect of the present invention, a data transmission device residing in an internal memory of a system-on-chip is provided, adapted for data transmission between the internal memory and an external memory coupled to the system-on-chip. The device includes: a task adding module adapted to add execution information of at least one data transmission task to be executed to a task queue; a task registration module adapted to send execution information of one data transmission task in the task queue to a direct access device for the direct access device to execute the data transmission task; and a request response module adapted to receive an interrupt request sent by the direct access device. The interrupt request is used to indicate completion of the execution of the data transmission task, and call the task registration module in response to the interrupt request, so that the task registration module sends execution information of a next data transmission task to be executed in the task queue to the direct access device.

According to a third aspect of the present invention, a system-on-chip is provided, including a processor, an internal memory, and a direct access device, the system-on-chip being coupled to an external memory. The processor is adapted to add execution information of at least one data transmission task to be executed to a task queue, and send execution information of one data transmission task in the task queue to a direct access device, where the data transmission task is adapted to implement data transmission between the internal memory and the external memory; the direct access device is adapted to execute the data transmission task according to the received execution information, and send an interrupt request to the processor after completion of the execution of the data transmission task; and the processor sends execution information of a next data transmission task in the task queue to the direct access device in response to the interrupt request.

Optionally, in the system-on-chip according to the present invention, a hardware acceleration unit being coupled to the internal memory is included. The data transmission task includes: transmitting data in the external memory to the internal memory, so that the hardware acceleration unit fetches and processes the data; and transmitting the processed data from the internal memory to the external memory after the hardware acceleration unit has processed the data.

Optionally, in the system-on-chip according to the present invention, the execution information includes a source starting address, a destination starting address, and a data size of the data transmission.

According to a fourth aspect of the present invention, an intelligent device is provided, including the system-on-chip described above.

In accordance with the data transmission scheme of the present invention, the process maintains a task queue including execution information of data transmission tasks to be executed. The processor sends execution information of the data transmission tasks in the task queue in sequence to a direct access device for the direct access device to execute the data transmission tasks. Each time the direct access device completes one data transmission task, the processor immediately sends execution information of a next data transmission task in the task queue to the direct access device for the direct access device to continue to execute the next data transmission task. The task queue according to the present invention greatly reduces the time interval between two data transmission tasks executed by the direct access device, improving the utilization of the direct access device. The direct access device is able to function at full load, enabling the completion of data transmission as early as possible, thus reducing, or even eliminating the waiting time of the processor, and avoiding the waste of computing resources of the processor.

The foregoing description is merely an overview of the technical solutions of the present invention. In order to help better understand the technical means of the present invention to implement the technical means based on content of the specification, and to make the foregoing and other objectives, features and advantages of the present invention more comprehensible, the following describes specific embodiments of the present invention.

BRIEF DESCRIPTION OF DRAWINGS

To achieve the above and related objectives, some illustrative aspects are described herein with reference to the following description and the accompanying drawings. The aspects indicate various ways to practice the principles disclosed herein, and all aspects and their equivalents are intended to fall within the scope of the claimed subject. The above as well as other objectives, features and advantages of the disclosure will become more apparent from the following detailed description through reading in conjunction with the accompanying drawings. Throughout the disclosure, the same reference numerals generally refer to the same parts or elements.

DETAILED DESCRIPTION OF EMBODIMENTS

Exemplary embodiments of the present disclosure will be described below in more detail with reference to the accompanying drawings. Although the accompanying drawings show exemplary embodiments of the present disclosure, it should be understood that the present disclosure may be implemented in various forms and should not be limited by the embodiments described herein. Instead, these embodiments are provided so that the present disclosure will be better understood, and the scope of the present disclosure can be fully conveyed to those skilled in the art.

As to the problems present in the prior art, the present invention provides a data transmission method and device to increase the efficiency of data transmission between an internal memory of a system-on-chip and an external memory, reducing the waste of processor computing resources as much as possible.

Figure 3:
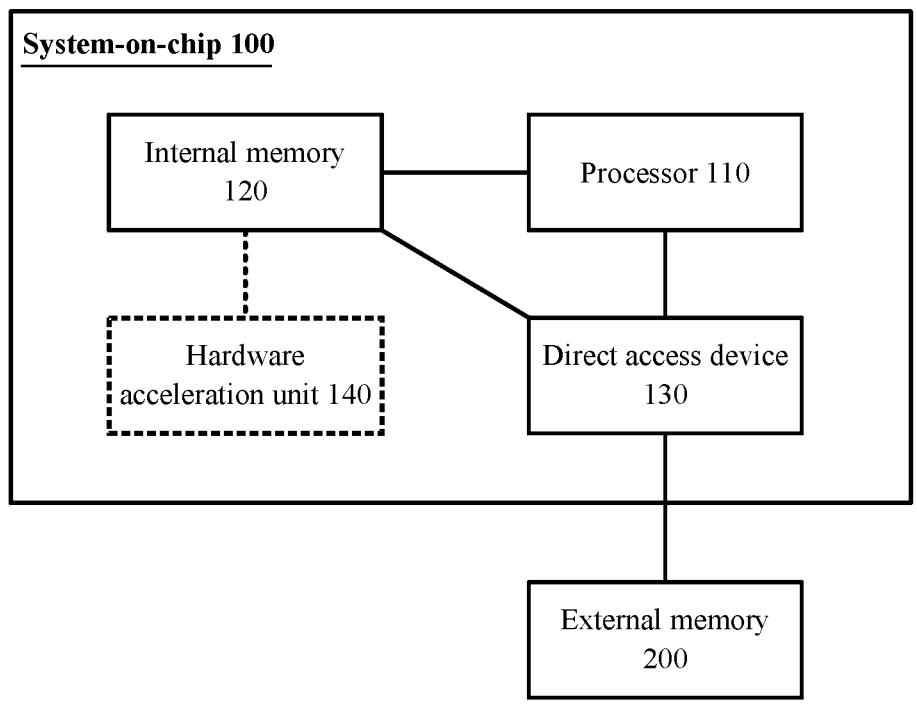
FIG. 3 illustrates a schematic diagram of a system-on-chip 100 according to one embodiment of the present invention.

FIG. 3 illustrates a schematic diagram of a system-on-chip 100 according to one embodiment of the present invention. The system-on-chip 100 may be included in an intelligent device to implement corresponding functions in the intelligent device. The implementable functions include but are not limited to executing related control programs, data analysis, computing and processing, network communication, controlling peripherals of the intelligent device, and the like. Such intelligent devices may be, for example, a personal mobile terminal such as a mobile phone, and a tablet computer, or may be Internet of Things devices such as a smart speaker, a smart access control system, a smart in-vehicle device, and a smart industrial control device, but not limited thereto.

As shown in FIG. 3, the system-on-chip 100 includes a processor 110 and an internal memory 120. The processor 110 for example may be implemented as a single-core or multi-core processor. Program instructions and related data are stored in the internal memory 120. The processor 110 is coupled to the internal memory 120, for example via an in-chip bus. The processor 110 executes corresponding operations and controls tasks based on the instructions and data stored in the internal memory 120.

When the system-on-chip 100 is applied to an Internet of Things device, it is typically required to meet the design requirements for low power consumption and low cost. Both the computing capability of the processor 110 and the storage space of the internal memory 120 are low. To achieve the storage of a large amount of data, as shown in FIG. 3, an external memory 200 is typically coupled to the system-on-chip 100.

It is fast reading from and writing into the internal memory 120 of the system-on-chip which however has a small capacity, while it is slow reading from and writing into the external memory 200 that has a large capacity.

According to an embodiment, the internal memory 120 is a tightly coupled memory (TCM), and the internal memory 120 is tightly coupled to the processor 110, and able to provide to the processor 110 a data access service with performance equivalent to that of a cache (not shown in FIG. 3). The difference from a cache is that the processor 110 may accurately control which data is stored in the TCM; while a cache is a fast storage area for a general purpose, where which data is stored depends on the statistical characteristics of the cache itself, not controlled by the processor 110. The tightly coupled memory further includes an instruction TCM (Instruction TCM, ITCM) for storing instructions and a data TCM (Data TCM, DTCM) for storing data.

The external memory 200 for example may be implemented as a dynamic random access memory (Dynamic Random Access Memory, DRAM) or a synchronous dynamic random access memory (synchronous dynamic random-access memory, SDRAM) but is not limited thereto.

In some application scenarios, it is required to implement data transmission between the external memory 120 and the external memory 200 to enable accelerated access to data, thus balancing the read/write speed and the storage capacity.

In one application scenario, the processor 110 performs accelerated access purposely to specific instructions or data, for example performing accelerated access purposely to program instructions such as commonly used interrupt handler, and encryption and decryption functions, to increase the speed of interrupt handling and data encryption and decryption. Because it is unable to implement acceleration of specific data in a cache, it is required to transmit the specific data from the external memory 200 to the internal memory 120 from which the processor 110 fetches the specific data to enable accelerated access.

In another application scenario, the system-on-chip 100 is included in a smart speaker, a smart access control system, or a smart in-vehicle device, for computing tasks such as audio and image processing. As shown in FIG. 3, the system-on-chip 100 also includes a hardware acceleration unit 140. The hardware acceleration unit 140 is an application specific integrated circuit (Application Specific Integrated Circuit, ASIC) specifically adapted to execute specific computing tasks (for example, executing floating-point operations at a specific processing layer in a neural network), to speed up the computational process to save computing time. The hardware acceleration unit 140 is coupled to the internal memory 120 via an in-chip bus, and it is able to access only data in the internal memory 120, but not that in the external memory 200. Accordingly, it is required to transmit data in the external memory 200 to the internal memory 120 for the hardware acceleration unit 140 to read and process. The hardware acceleration unit 140 transmits the processed data from the internal memory 120 to the external memory 200 (that is, writing data in the internal memory 120 back to the external memory 200) after it has completed the processing. During the process of the hardware acceleration unit 140 executing a computing task, data is transmitted back and forth many times between the internal memory 120 and the external memory 200.

The data transmission tasks between the internal memory 120 and the external memory 200 may be executed by the processor 110. In this case, the processor 110 spends a lot of time in waiting for the memory 120 and the memory 200 to execute I/O operations, and it is unable to execute other computing tasks when waiting, resulting in a waste of computing resources of the processor 110. To avoid the waste of computing resources caused by the processor 110 executing data transmission task, as shown in FIG. 3, a direct access device 130 is included in the system-on-chip 100. The direct access device 130 may for example be implemented as a direct memory access (DMA) device.

The direct access device 130 executes a data transmission task based on a control instruction of the processor 110 to implement asynchronous data transmission between the internal memory 120 and the external memory 200. While the direct access device 130 executes the data transmission task, the processor 110 may execute other computing tasks, without having to waste time waiting for the completion of the data transmission task in particular.

Figure 1:
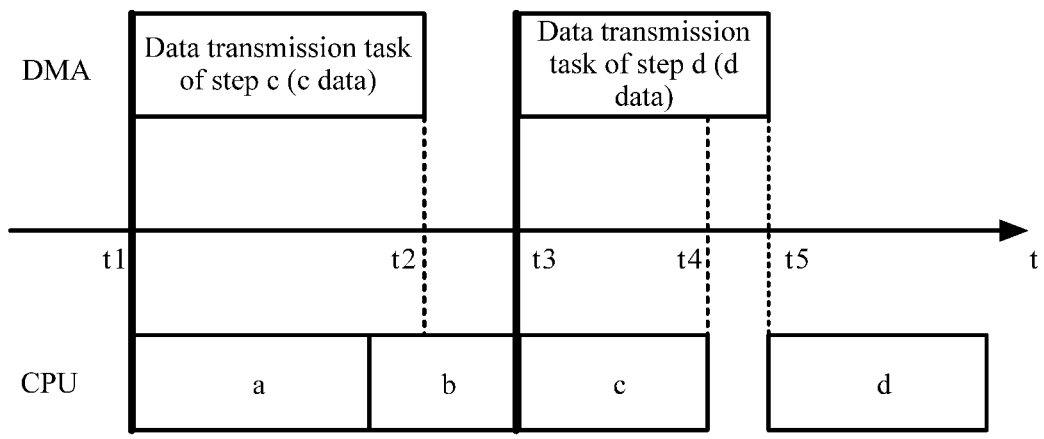
FIG. 1 illustrates a schematic diagram of a data transmission process of the prior art.

To further increase the efficiency of data transmission, a data transmission method 400 is provided by the present invention, avoiding the situation of wasting the computing resources of the processor 110 as shown in FIG. 1, at best effort.

In the data transmission method 400 of the present invention, the processor 110 maintains a task queue. The task queue is in the internal memory 120 of the system-on-chip and used to store execution information of data transmission tasks to be executed. When the processor 110 finds a data transmission task to be executed, the processor 110 stores the execution information of the task into the task queue. The processor 110 sends the execution information of the data transmission tasks in the task queue in sequence to the direct access device 130 for the direct access device 130 to execute the data transmission tasks, enabling data transmission between the internal memory 120 and the external memory 200. Each time after the direct access device 130 completes one data transmission task, the direct access device 130 sends an interrupt request to the processor 110, and the processor 110 immediately sends a next data transmission task in the task queue to the direct access device 130 for execution. The task queue according to the present invention greatly reduces the interval between two data transmission tasks executed by the direct access device 130, improving the utilization of the direct access device 130. The direct access device 130 is able to function at full load, enabling the completion of data transmission as early as possible, thus reducing, or even eliminating the waiting time of the processor 110, and avoiding the waste of computing resources of the processor 110.

Figure 2:
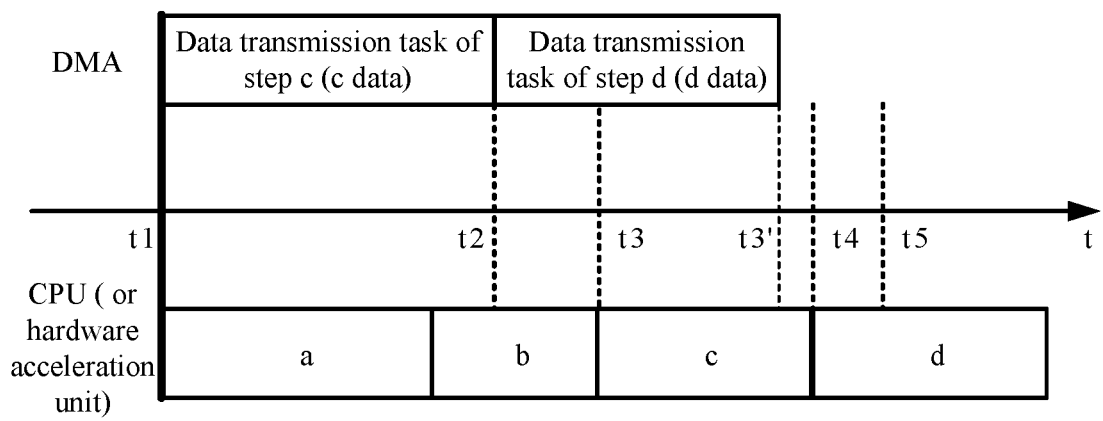
FIG. 2 illustrates a schematic diagram of the effect of data transmission according to one embodiment of the present invention.

FIG. 2 illustrates a schematic diagram of the effect of data transmission after employing the data transmission method 400 of the present invention. In the embodiment shown in FIG. 2, four steps, a to d, are included in a program, where it is required to transmit data from an external memory to an internal memory in steps c and d, and the steps c and d each correspond to one data transmission task. Before executing step a of the program, a processor (CPU) stores the execution information of the data transmission tasks corresponding to steps c and d into the task queue (the task queue is not shown in FIG. 2).

At the moment t1, the processor sends the execution information of data transmission task c to a direct access device (DMA), and then the DMA starts to transmit the data of step c, while at the same time the processor executes step a.

At the moment t2, the DMA completes the data transmission of step c and sends an interrupt request to the CPU. The CPU pauses the execution of step d and responds to the interrupt request by sending the execution information of data transmission task d to the DMA. The DMA immediately starts to transmit the data of step d, while the CPU proceeds to step b.

At the moment t3, the execution of step b is completed. Because the DMA has completed the data transmission of step c at the moment t2, the CPU may immediately execute step c after the execution of step b is completed.

At the moment t3', the DMA completes the data transmission of step d and sends an interrupt request to the CPU. The CPU pauses the execution of step c and responds to the interrupt request. Now that the data transmission tasks in the current task queue are all completed, the CPU stops sending execution information of any data transmission task to the DMA, and the DMA is idle.

At the moment t4, the execution of step c is completed. Because the DMA has completed the data transmission of step d at the moment t3', the CPU may immediately execute step d after the execution of step c is completed.

As shown in FIG. 2, after the data transmission scheme of the present is adopted, the DMA may continuously execute the data transmission tasks of step c and step d, and the CPU may continuously execute steps a to d without the need to wait for the data transmission by the DMA, and without wasting computing resources. Compared with the embodiment of the prior art shown in FIG. 1, the time interval between two data transmission tasks executed by the DMA is reduced in the embodiment of FIG. 2. This improves the utilization of the DMA and thus the efficiency of data transmission, enabling the completion of data transmission as early as possible, thus reducing, or even eliminating the waiting time of the CPU, and avoiding the waste of computing resources of the CPU.

A further illustration to the data transmission scheme of the present invention is made in the following.

Figure 4:
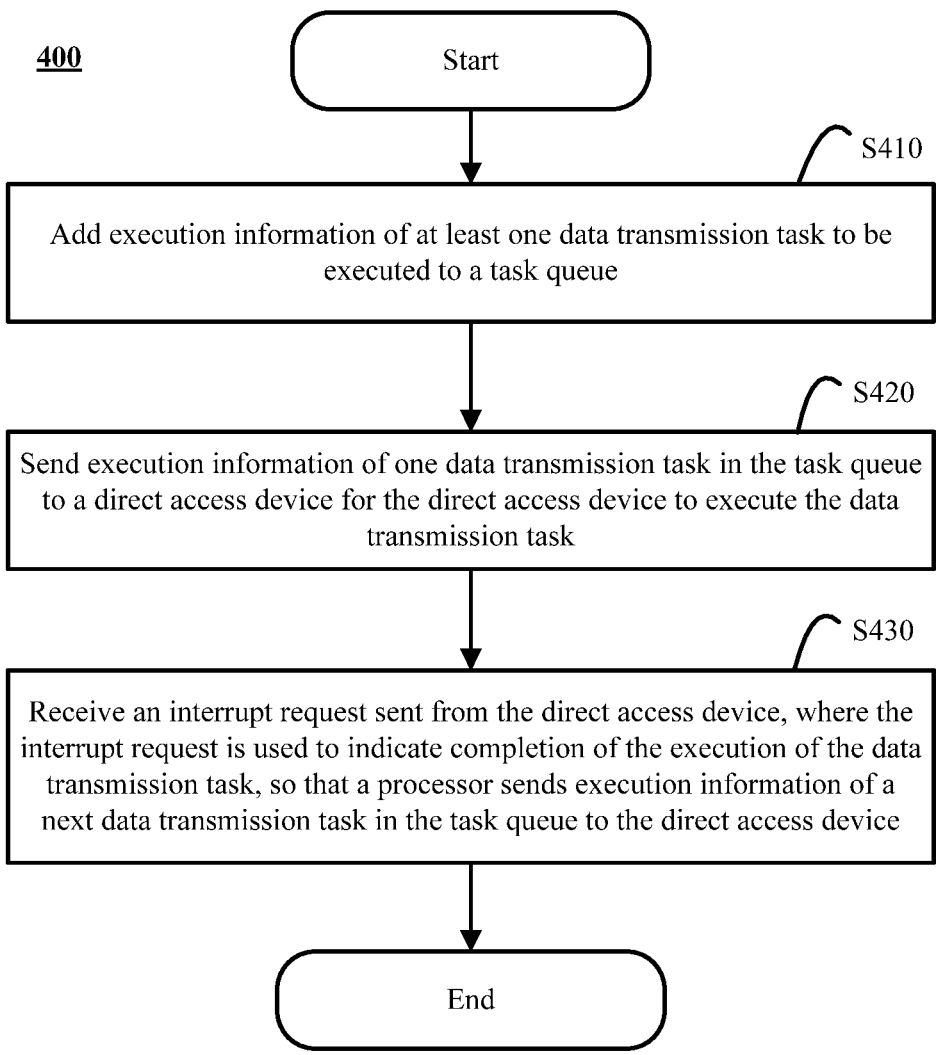
FIG. 4 illustrates a flowchart of a data transmission method 400 according to one embodiment of the present invention.

FIG. 4 illustrates a flowchart of a data transmission method 400 according to one embodiment of the present invention. The method 400 is executed by the processor 110 of a system-on-chip adapted for data transmission between an internal memory 120 of the system-on-chip and an external memory 200 coupled to the system-on-chip. As shown in FIG. 4, the method 400 begins with step S410.

In step S410, execution information of at least one data transmission task to be executed is added to a task queue.

According to an embodiment, the task queue is a linked list structure for dynamically adding or deleting a data transmission task in the task queue. Each time the processor 110 detects a data transmission task to be executed, the processor 110 adds the execution information of the data transmission task to the tail of the linked list. To save storage space, the task queue may be further implemented as a circular linked list.

Figure 5:
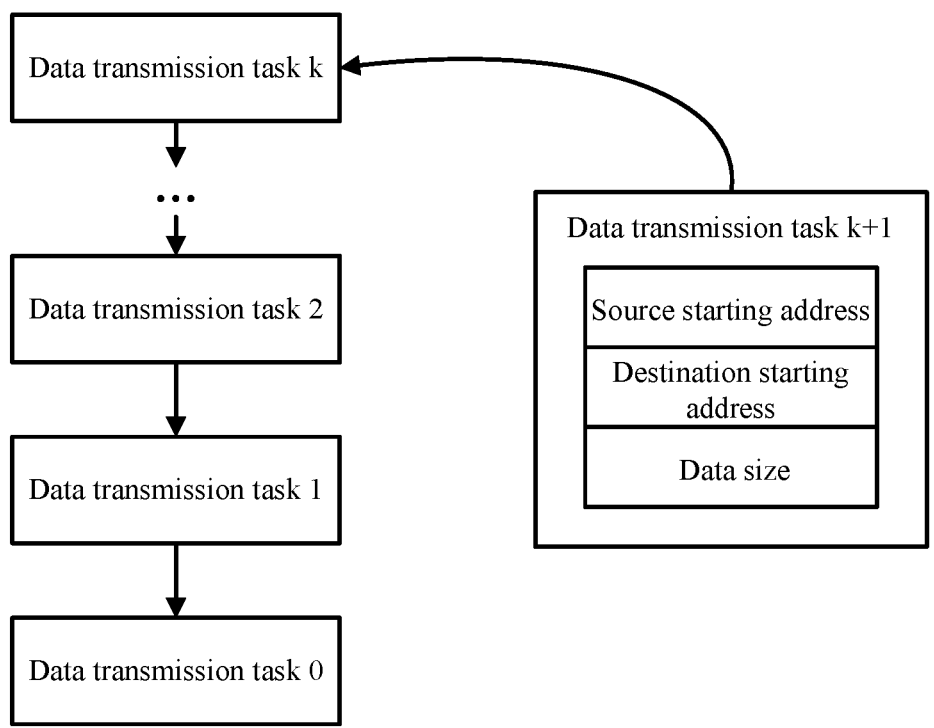
FIG. 5 illustrates a schematic diagram of a task queue according to one embodiment of the present invention.

FIG. 5 illustrates a schematic diagram of a task queue using a linked list structure. As shown in FIG. 5, data transmission task 0 is the first data transmission task to be executed in a linked list, also referred to as the header of the linked list. Included in a current linked list are k data tasks to be executed. When a processor 110 detects a new data transmission task k+1, the processor 110 adds execution information of the data transmission task to the tail of the linked list.

According to an embodiment, as shown in FIG. 5, execution information of a data transmission task includes a source starting address (src), a destination starting address (dst), and a data size (size) of the data transmission. The data transmission task is to transmit data from a storage area starting from the source starting address src and with a size equal to the data size to a storage area starting from the destination starting address dst and with a size equal to the data size. For example, the source starting address is 0x00000000, the destination starting address is 0x20000000, and the data size is 0x03a4. Then data in the storage area 0x00000000-0x000003a3 is correspondingly transmitted to the storage area 0x20000000-0x200003a3.

Figure 6:
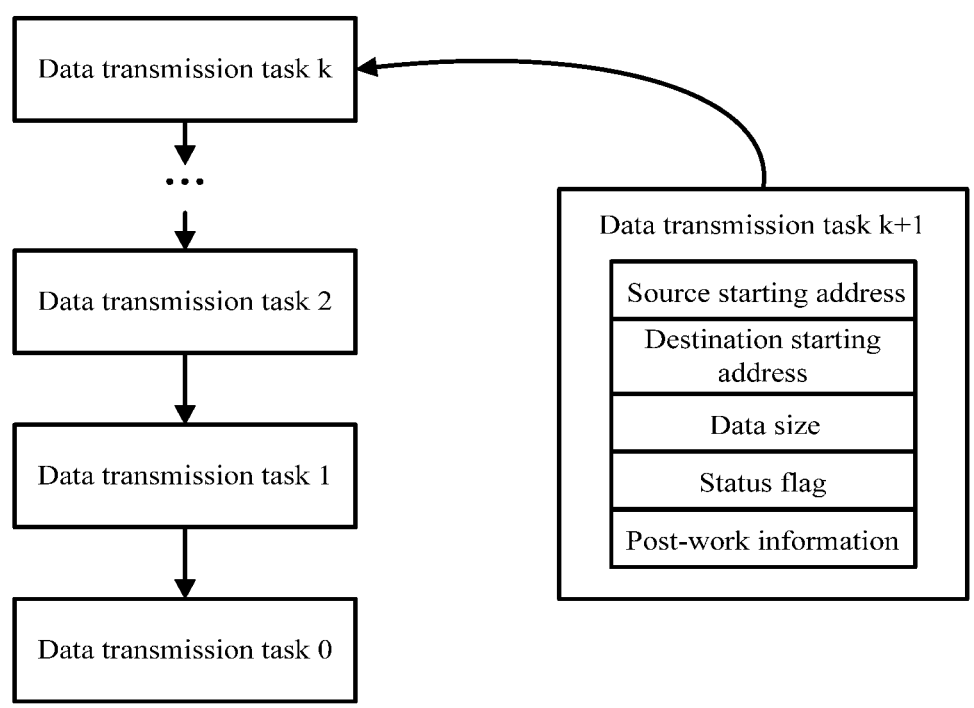
FIG. 6 illustrates a schematic diagram of a task queue according to another embodiment of the present invention.

According to an embodiment, as shown in FIG. 6, in addition to execution information of each data transmission task, a status (status) flag of each data transmission task is also included in the task queue, the status flag including for example not-executed, being-executed, and executed. After execution information of a data transmission task to be executed is added to the task queue, the status flag of the data transmission task is set to not-executed. In a subsequent step S420, the status flag of the data transmission task is set to being-executed after the execution information of the data transmission task is sent to the direct access device. In a subsequent step S430, the status flag of the data transmission task is set to executed after an interrupt request is received from the direct access device for indicating completion of the execution of the data transmission task.

The status flag of the data transmission task may be used for determining whether data in the destination address of the data transmission task is available, where the destination address is an address range starting from the destination starting address dst and with a size equal to the data size. When the status flag is not-executed or being-executed, the data transmission task is not completed, and data in the destination address is not available. If the status flag is executed, the data transmission task is completed, and data in the destination address is available. If the destination address is in the internal memory 120 of the system-on-chip, then the processor 110 or the hardware acceleration unit 140 may fetch the data in the destination address and perform computational processing on it.

According to an embodiment, as shown in FIG. 6, in addition to execution information of each data transmission task, post-work information of each data transmission task is also included in the task queue. The post-work information contains operations required to be executed after completion of the execution of the data transmission task. It may for example be to free storage space in the source address (that is, deleting data in the source address), verify whether data written to the destination address is correct, verify whether the direct access device has correctly executed the data transmission task, but not limited thereto.

Steps S420 and S430 are used to execute data transmission tasks according to the task queue. It is to be noted that steps S420 and S430 describe the execution process of one data transmission task. When a plurality of data transmission tasks to be executed are included in the task queue, steps S420 and S430 are accordingly repeated a plurality of times.

In step S420, execution information of one data transmission task in the task queue is sent to the direct access device for the direct access device to execute the data transmission task.

"One data transmission task" in step S420 generally refers to the first data transmission task to be executed in the task queue.

Figure 7:
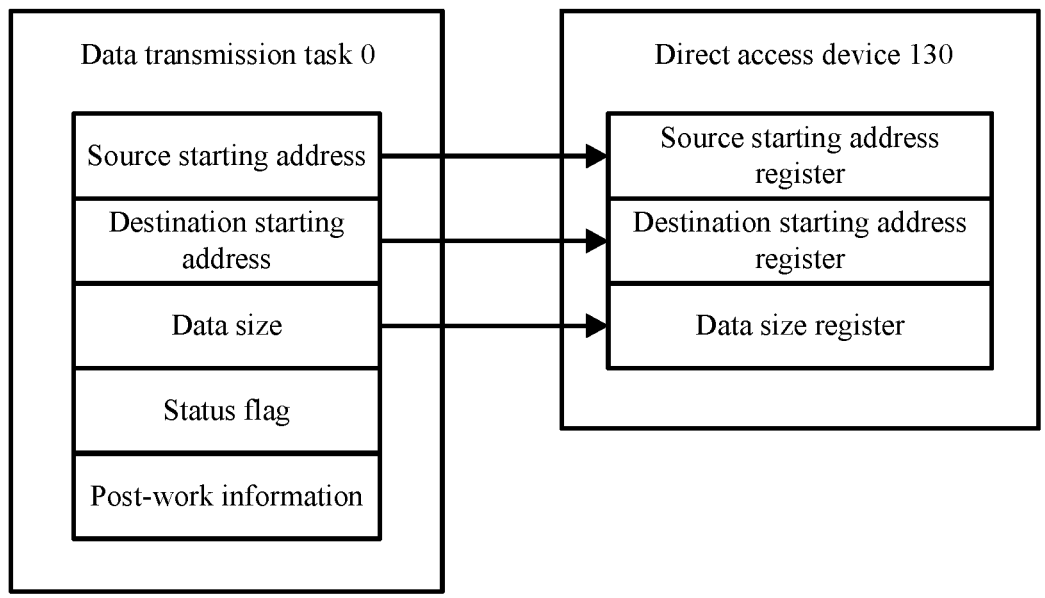
FIG. 7 illustrates a schematic diagram of a process of sending execution information of a data transmission task to a direct access device (DMA) according to one embodiment of the present invention.

According to an embodiment, in step S420, the processor 110 writes the execution information of the data transmission task to a configuration register of the direct access device 130. FIG. 7 shows a schematic diagram of the process.

As shown in FIG. 7, the first data transmission task to be executed in the current task queue is data transmission task 0. The direct access device 130 includes a source starting address register, a destination starting address register, and a data size register. The processor 110 sends the source starting address, the destination starting address, and the data size of data transmission task 0 respectively to the source starting address register, the destination starting address register, and the data size register of the direct access device 130.

According to an embodiment, the processor sets the status flag of the data transmission task to being-executed after sending the execution information of the data transmission task to the direct access device.

After receiving the execution information sent by the processor, the direct access device executes the data transmission task according to the execution information. If the source starting address is in the internal memory 120, and the destination starting address is in the external memory 200, then the data in the internal memory 120 is transmitted to the external memory 200; if the source starting address is in the external memory 200, and the destination starting address is in the internal memory 120, then the data in the external memory 200 is transmitted to the internal memory 120.

The DMA device sends an interrupt request to the processor after completing the execution of the current data transmission task. Accordingly, the processor executes step S430, receiving the interrupt request sent from the direct access device, the interrupt request being adapted to indicate completion of the execution of the data transmission task.

After receiving the interrupt request sent from the direct access device, the processor responds to it. According to an embodiment, after receiving the interrupt request sent from the direct access device, the processor sets the status flag of the corresponding data transmission task to executed, and executes the post-work of the data transmission task. After the execution of the post-work is completed, execution information of a next data transmission task in the task queue is sent to the direct access device for the direct access device to execute the data transmission task.

For example, in step S430, the processor receives an interrupt request sent from the direct access device, the interrupt request indicating completion of data transmission task 0. Subsequently, the processor sends execution information of the next data transmission task in the task queue (the task queue is shown in FIG. 5 and FIG. 6), that is, the execution information of data transmission task 1, to the direct access device for the direct access device to execute data transmission task 1 according to the received execution information.

It is understood by those skilled in the art that if the interrupt request sent in step S430 indicates completion of the execution of the last data transmission task in the task queue, then no next data transmission task is present in the task queue, so the process of data transmission ends, and the processor send no more execution information to the direct access device.

It is to be noted that although in the embodiment shown in FIG. 4, steps S410 to S430 are executed in sequence, there is no strict execution order between step S410 and steps S420-S430. Step S410 may be executed at any stage of the data transmission method 400. That is, each time the processor 110 detects a data transmission task to be executed, the processor 110 adds the execution information of the task to the task queue.

And, to increase the efficiency of data transmission, reduce or even eliminate the waiting time of the processor, and avoid the waste of computing resources of the processor, the processor 110 always adds execution information of a data transmission task to be executed to the task queue as early as possible.

For example, a particular program includes six steps a to f, where it is required to transmit data in steps c and e, and there are no dependencies between the data transmitted in these two steps. The processor 110 adds the execution information of data transmission tasks c and e to the task queue as early as possible, which means that before executing the program, the processor 110 adds the execution information of data transmission tasks c and e to the task queue, and then starts to execute the first step a of the program. In this way, step a executed by the processor and data transmission task c executed by the direct access device 130 can be executed simultaneously, maximizing the utilization of the direct access device 130, and minimizing the possibility of the processor 110 waiting for data transmission.

Figure 8A:
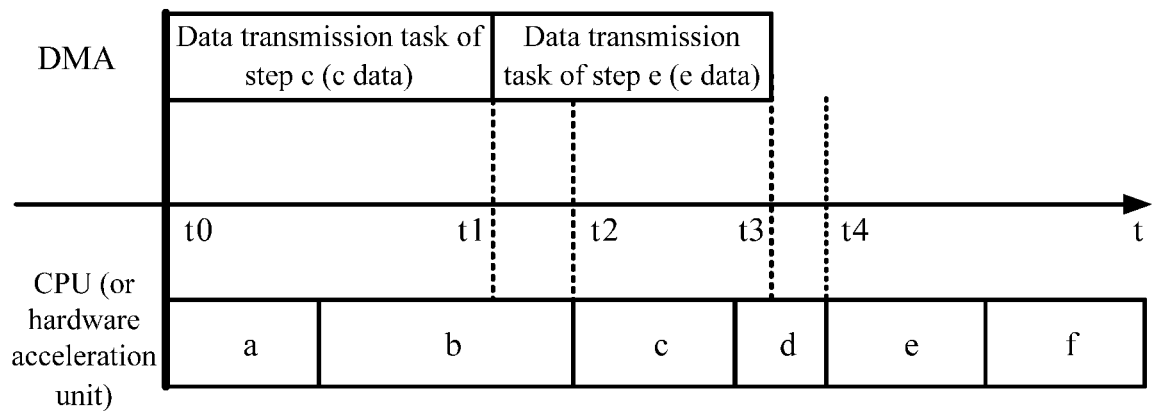
FIGS. 8A and 8B illustrate schematic diagrams of the effects of data transmissions on different occasions of adding execution information of a data transmission task to a task queue.
Figure 8B:
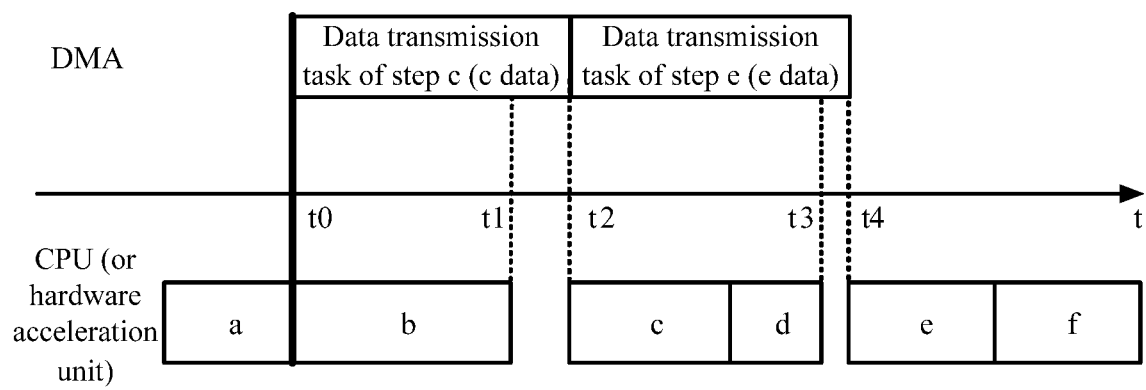

FIGS. 8A and 8B illustrate schematic diagrams of the effects of data transmission on different occasions of adding execution information of a data transmission task to a task queue.

FIG. 8A illustrates a schematic diagram of the effect of data transmission of adding execution information of data transmission tasks c and e to the task queue (the task queue is not shown in FIG. 8A) before executing step a. As shown in FIG. 8A, a processor (CPU) starts to execute step a at the moment t0 after writing the data of data transmission tasks c and e to the task queue; at the same time, a direct access device starts to transmit the data of step c. In this embodiment, because the moment t1 at which the DMA completes the data transmission task of step c is earlier than the moment t2 at which the CPU completes the execution of step b, the CPU may immediately execute step c after the execution of step b is completed. And, because the moment t3 at which the DMA completes the data transmission task of step e is earlier than the moment t4 at which the CPU completes the execution of step d, the CPU may immediately execute step e after the execution of step d is completed. In this embodiment, the CPU may continuously execute steps a to f without the need to wait for the data transmission by the DMA, and without wasting computing resources.

FIG. 8B illustrates a schematic diagram of the effect of data transmission of adding execution information of data transmission tasks c and e to the task queue (the task queue is not shown in FIG. 8B) after the execution of step a is completed. As shown in FIG. 8B, the CPU writes data transmission tasks c and e to the task queue after the execution of step a is completed. Later, at the moment to, the CPU starts to execute step b; at the same time, the DMA starts to transmit the data of step c. In this embodiment, because the moment t2 at which the DMA completes the data transmission task of step c is later than the moment t1 at which the CPU completes the execution of step b, the CPU is unable to immediately execute step c after the execution of step b is completed, but waits for the completion of data transmission by the DMA. The CPU is in a waiting status during the time period of t1 to t2, and its computing resources are wasted. Furthermore, because the moment t4 at which the DMA completes the data transmission task of step e is later than the moment t3 at which the CPU completes the execution of step d, the CPU is unable to immediately execute step e after the execution of step d is completed, but waits for the completion of data transmission by the DMA. The CPU is in a waiting status during the time period of t3 to t4, and its computing resources are wasted.

Figure 9:
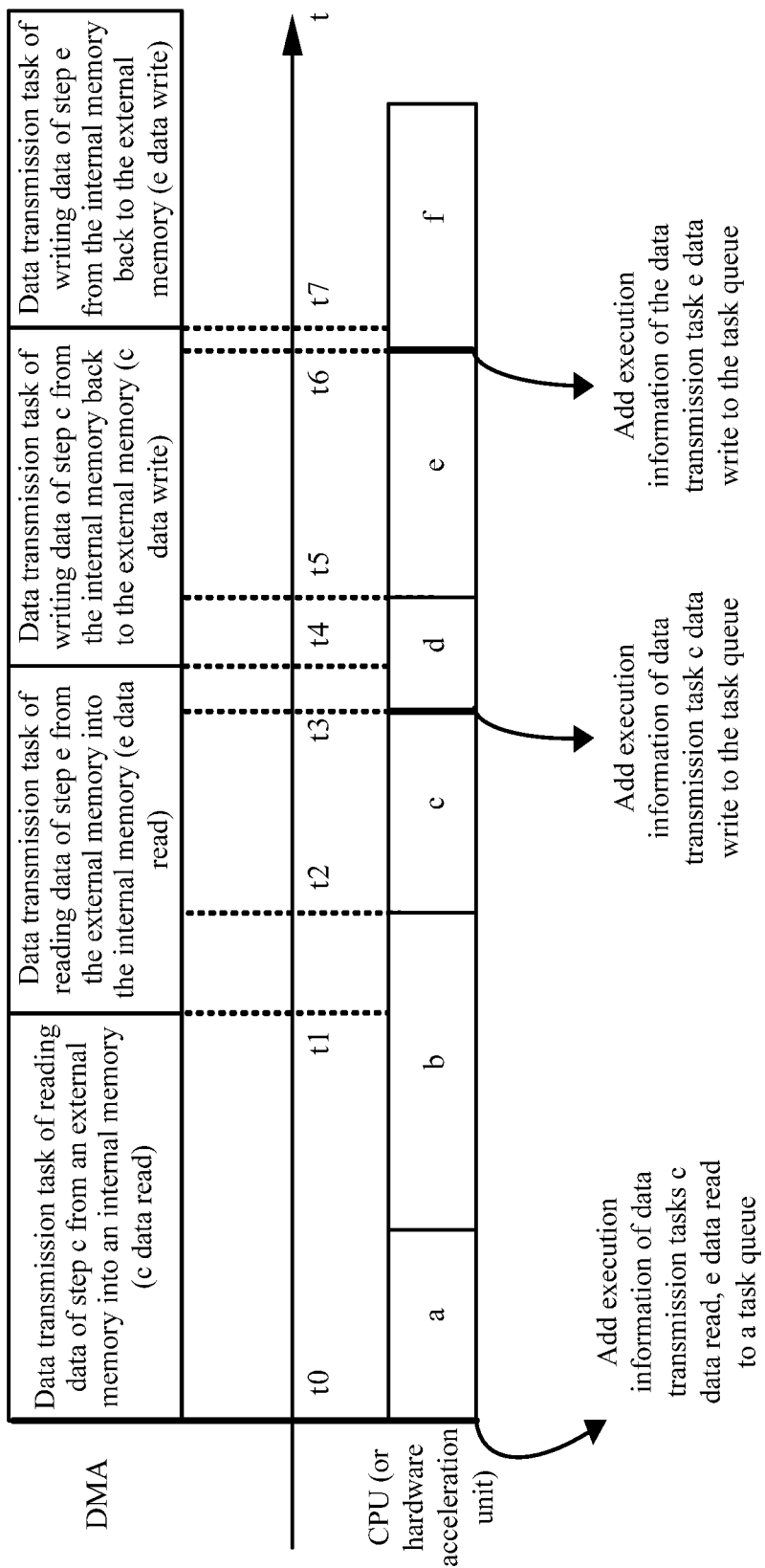
FIG. 9 illustrates a schematic diagram of the effect of data transmission according to another embodiment of the present invention.

FIG. 9 illustrates a schematic diagram of the effect of data transmission according to one embodiment of the present invention. In this embodiment, a particular program includes six steps a to f, where it is required to transmit data in steps c and e, and there are no dependencies between the data transmitted in these two steps. Before the CPU executes step a, the CPU writes the data transmission tasks, c data read and e data read, to the task queue. These two data transmission tasks transmit data needed in step c and step e respectively from the external memory to an internal memory closer to the CPU, that is, reading data from the external memory into the internal memory.

At the moment t0, the CPU starts to execute step a, and the DMA starts to read in the data of step c.

Because the moment t1 at which the DMA completes the data transmission task of step c is earlier than the moment t2 at which the CPU completes the execution of step b, the CPU may immediately execute step c after the execution of step b is completed.

After the CPU completes the execution of step c at the moment t3, the CPU adds the data transmission task c data write to the task queue. The data transmission task transmits the processed data of step c from the internal memory to the external memory, that is, writing data from the internal memory back to the external memory. In this way, after completing the execution of the data transmission task e data read at the moment t4, the DMA proceeds to execute the data transmission task c data write.

Because the moment t4 at which the DMA completes the data transmission task of step e is earlier than the moment t5 at which the CPU completes the execution of step d, the CPU may immediately execute step e after the execution of step d is completed.

After the CPU completes the execution of step e at the moment t6, the CPU adds the data transmission task e data write to the task queue. The data transmission task transmits the processed data of step e from the internal memory to the external memory, that is, writing data from the internal memory back to the external memory. In this way, after completing the execution of the data transmission task c data write at the moment t6, the DMA may proceed to execute the data transmission task e data write.

The data transmission scheme of the present invention may implement efficient data transmission between an internal memory of a system-on-chip and an external memory, thus better utilizing processor computing resources, and storing more data into the external memory with a larger capacity.

The data transmission method 400 of the present invention is executed by the processor. In particular, those skilled in the art may write program instructions for executing the data transmission method 400 of the present invention, and write the program instructions to the internal memory 120. The processor 110 reads and executes the program instructions from the internal memory 120, implementing the data transmission method 400 of the present invention.

Figure 10:
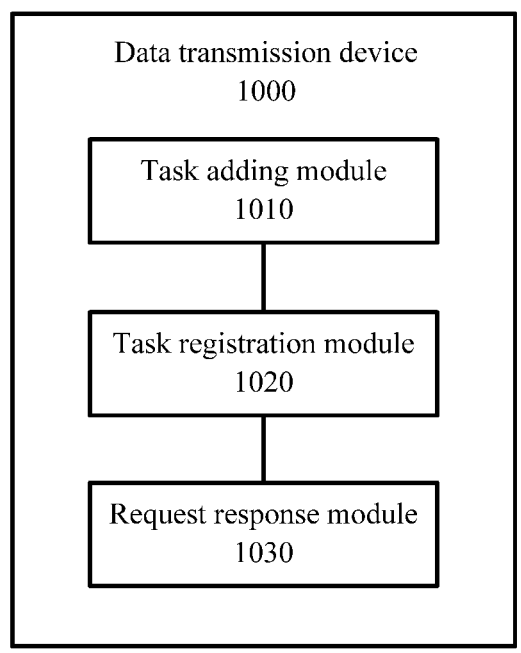
FIG. 10 illustrates a schematic diagram of a data transmission device 1000 according to one embodiment of the present invention.

FIG. 10 illustrates a schematic diagram of a data transmission device 1000 according to one embodiment of the present invention. The data transmission device 1000 is a program instruction set used for instructing a processor 110 to execute a data transmission method 400. The data transmission device 1000 resides in an internal memory 120 of a system-on-chip, and is adapted for data transmission between the internal memory 120 and an external memory 200 coupled to the system-on-chip 100. As shown in FIG. 10, the data transmission device 1000 includes three functional modules: a task adding module 1010, a task registration module 1020, and a request response module 1030.

The task adding module 1010 is adapted to add execution information of at least one data transmission task to be executed to a task queue. The task adding module 1010 is specifically adapted to execute the method of the foregoing step S410. For specific processing logic and functions of the task adding module 1010, refer to the related description of the foregoing step S410. Details are not described herein again.

The task registration module 1020 is adapted to send execution information of one data transmission task in the task queue to a direct access device for the direct access device to execute the data transmission task, and send execution information of a next data transmission task in the task queue to the direct access device after the direct access device completes the execution of the data transmission task. The task registration module 1020 is specifically adapted to execute the method of the foregoing step S420. For specific processing logic and functions of the task registration module 1020, refer to the related description of the foregoing step S420. Details are not described herein again.

The request response module 1030 is adapted to receive an interrupt request sent from the direct access device, and the interrupt request is adapted to indicate completion of the execution of the data transmission task. According to an embodiment, the request response module is also adapted to respond to the interrupt request, for example setting a status flag of the corresponding data transmission task to executed, executing post-work of the data transmission task, and calling the task registration module 1020 to send execution information of a next data transmission task in the task queue to the direct access device. The request response module 1030 is specifically adapted to execute the method of the foregoing step S430. For specific processing logic and functions of the request response module 1030, refer to the related description of the foregoing step S430. Details are not described herein again.

The system-on-chip 100 of the present invention may be included in an intelligent device to implement corresponding functions in the intelligent device, including but not limited to executing related control programs, data analysis, computing and processing, network communication, and controlling peripherals of the intelligent device.

Such intelligent devices include dedicated intelligent devices such as mobile terminals and personal digital terminals. The devices include one or more system-on-chips of the present invention to perform data processing or control peripherals of the device.

Such intelligent devices also include dedicated devices designed for specific functions, for example, smart speakers and smart display devices. These devices include the system-on-chip of the present invention to control a speaker or a display device, so as to provide the speaker or the display device with additional functions of communication, perception, data processing, and the like.

Such intelligent devices also include various IoT and AIoT devices. These devices include the system-on-chip of the present invention to perform data processing, for example, AI computing or data communication and transmission, thereby implementing denser and more intelligent device distribution.

Such intelligent devices may also be used in a vehicle, for example, may be implemented as a vehicle-mounted device or may be built into the vehicle, so as to provide a data-processing capability for intelligent driving of the vehicle.

Such intelligent devices may also be used in the home and entertainment field, for example, may be implemented as a smart speaker, a smart earphone, a smart air conditioner, a smart refrigerator, a smart display device, or the like. These devices include the system-on-chip of the present invention to perform data processing and peripheral control, making home and entertainment devices intelligent.

In addition, such intelligent devices may also be used in the industrial field, for example, may be implemented as an industrial control device, a sensing device, an IoT device, an AIoT device, a braking device, or the like. These devices include the system-on-chip of the present invention to perform data processing and peripheral control, making industrial equipment intelligent.

The foregoing description of intelligent devices is merely exemplary, and the intelligent device according to the present invention is not limited thereto. All intelligent devices capable of performing data processing by using the system-on-chip of the present invention fall within the protection scope of the present invention.

In the following, by way of example, the system-on-chip 100 of the present invention is applied to a smart speaker and a smart earphone to illustrate the technical effect of the data transmission scheme of the present invention.

Figure 11:
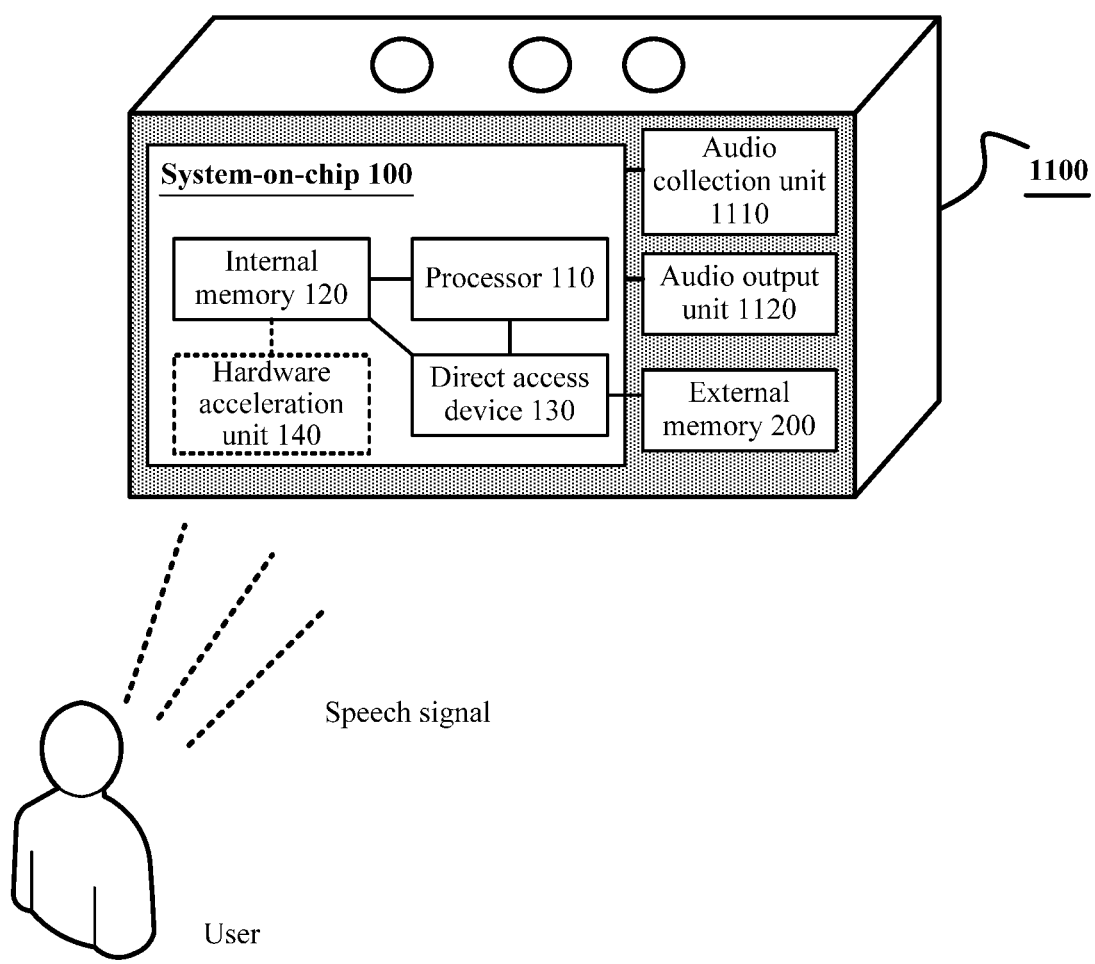
FIG. 11 illustrates a schematic diagram of a system-on-chip 100 of the present invention being applied to a smart speaker scenario.

FIG. 11 illustrates a schematic diagram of a system-on-chip 100 of the present invention applied to a smart speaker scenario. As shown in FIG. 11, the smart speaker 1100 includes a system-on-chip 100 and an external memory 200, an audio collection unit 1110, and an audio output unit 1120 that are coupled to the system-on-chip 100. The external memory 200, the audio collection unit 1110, and the audio output unit 1120 may be coupled to the system-on-chip 100 via, for example, an I/O interface provided on the system-on-chip 100, and perform data exchange with the related processing units inside the system-on-chip 100.

The audio collection unit 1110 may for example be a microphone, used for collecting speech signals from a user. The audio output unit 1120 may for example be a speaker, used for outputting speech signals to a user.

A user may issue various speech instructions in the course of using the smart speaker 1100. For example, when the user wants to use the smart speaker, it is required to speak out a corresponding wake-up word to wake up the smart speaker 1100. The wake-up word may be preset when the smart speaker leaves the factory, or may be set by the user himself in the course of using the smart speaker. The present invention imposes no limit on the length or content of wake-up word. In some embodiments, the wake-up word may be set to "smart speaker", "hello, speaker" or the like. After waking up the smart speaker 1100, the user may further issue a speech instruction to the smart speaker, for example, "Advise a song", "Broadcast the weather forecast, and "Open the curtain", to implement functions such as requesting a song, checking the weather, and controlling smart home devices.

After the user issues a speech instruction, the audio collection unit 1110 collects the speech signal from the user, and transmits it to the processor 110 of the system-on-chip 100 for processing. The processor 110 performs the processing of pre-emphasizing and framing on the speech signal transmitted from the audio collection unit 110, performs windowing on each frame, computes the frequency spectrum of each frame, and determines the speech features of each frame according to the frequency spectrum. A speech signal is a timing signal. Accordingly, the speech features of each frame generated by the processor 110 are sorted in time sequence. The speech features of each frame generated are stored into the external memory 200. Subsequently, the processor 110 inputs the speech features of each frame into a preset speech recognition model, and the model performs forward computations on the speech features of each frame and outputs the textual content corresponding to the speech signal, thereby identifying the user's intention, and providing the user with corresponding speech feedback.

The speech recognition model is generally a neural network model, for example, a Feedforward Sequential Memory Network (Feedforward Sequential Memory Networks, FSMN), or a Deep Feedforward Sequential Memory Network (Deep FSMN), but not limited thereto. The speech recognition model includes a plurality of convolutional layers, a plurality of timing information processing modules, and a softmax layer. Timing feature information of each frame is abstracted from the speech features of each frame sorted in time sequence after the features are input into the speech recognition model and processed by the convolutional layer. The timing feature information is processed by the plurality of timing information processing modules in turn, and enters into the softmax layer where the probability of occurrence of each text is derived, a text with highest probability serving as the speech recognition result.

The plurality of timing information processing modules of the speech recognition model are used for processing the timing feature information output from the convolutional layer, where each timing information processing module is used for processing a portion of the timing feature information. According to the data transmission scheme of the present invention, the timing feature information may be stored into the external memory 200. The transmission task of the timing feature information may be added to the task queue when needed, so that the direct access device 130 reads the timing feature information from the external memory 200 into the internal memory 120, and writes the processing result of the timing feature information from the internal memory 120 back to the external memory 200. While the direct access device 130 is performing data transmission, the processor 110 may perform computation processing based on the existing data in the internal memory 120. According to the data transmission scheme of the present invention, on the premise that the computing efficiency of the processor is not affected, a large amount of timing feature information is stored into the external memory 200, saving the storage space of the internal memory 120.

For example, the speech recognition model includes 6 timing information processing modules, denoted as processing module 1 to processing module 6. Each processing module is used for processing a portion of the timing feature information which is different from the portion processed by any other processing module. The portions of timing feature information processed by the processing module 1 to the processing module 6 are denoted respectively as data1 to data6. A storage space block in the internal memory 120 is allocated by the processor 110, the storage space block including 4 sub spaces: block1 to block4. Each sub space is able to store the timing feature information required by one processing module, so in the storage space block the timing feature information for up to 4 processing modules is stored at the same time.

Figure 12:
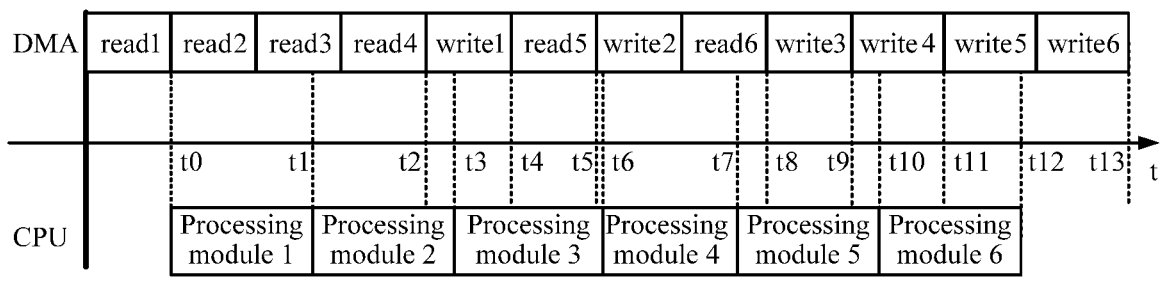
FIG. 12 illustrates a schematic diagram of the effect of data transmission in a smart speaker scenario.

As shown in FIG. 12, before executing the processing task of module 1, the processor 110 (CPU) adds execution information of data read tasks read1 to read4 of processing modules 1 to 4 into the task queue (the task queue is not shown in FIG. 12), the data read tasks read1 to read4 adapted to transmit the timing feature information data1 to data4 processed by the processing modules 1 to 4 from the external memory 200 to block1 to block4 of the internal memory 120. The direct access device 130 (DMA) executes tasks read1 to read4 in turn according to the sequence in the task queue, transmitting the timing feature information data1 to data4 required by module 1 to 4 respectively from the external memory 200 to block1 to block4 of the internal memory 120.

At the moment t0, the DMA completes the execution of the task read1, and sends an interrupt request to the CPU. The CPU starts to execute the computing task of the processing module 1, performing processing on data1.

At the moment t1, the CPU completes the data processing step of the processing module 1, the processed data being denoted as data1'. Subsequently, the execution information of the data write-back task write1 and the data read task read5 of the processing module 5 is added to the task queue. The data write-back task write1 is used for transmitting the processed data data1 from the block1 of the internal memory to the external memory 200, while the data read task read5 is used for transmitting the timing feature information data5 to be processed by the module 5 from the external memory to the block1 of the internal memory. In this way, after completing the execution of the data read task read4 of the processing module 4, the DMA proceeds to execute the data write-back task write1 and the data read task read5.

And at the moment t1, the DMA has already executed the task read2, and the data data2 of the processing module 2 is transmitted to the block2 of the internal memory 120.

At the moment t2, the DMA completes the tasks read3 and read4, and the data data3 and data4 of the processing module 3 and 4 respectively are transmitted to the block3 and block4 of the internal memory 120.

At the moment t3, the CPU completes the data processing step of the processing module 2, the processed data being denoted as data2'. Subsequently, the execution information of the data write-back task write2 and the data read task read6 of the processing module 6 is added to the task queue. The data write-back task write2 is used for transmitting the processed data data2 from the block2 of the internal memory to the external memory 200, while the data read task read6 is used for transmitting the timing feature information data6 to be processed by the module 6 from the external memory to the block2 of the internal memory. In this way, after completing the execution of the data read task read5 of the processing module 5, the DMA proceeds to execute the data write-back task write2 and the data read task read6.

At the moment t4, the DMA completes the task write1, writing the data1' back to the external memory 200. After write-back, the original data data1' may be retained in the block1, as shown in FIG. 12. Later after data5 is transferred to the block1, the original data data1' is overridden by the data5.

At the moment t5, the DMA completes the task read5, reading the data5' into the block1 of the internal memory 120.

At the moment t6, the CPU completes the data processing step of the processing module 3, the processed data being denoted as data3'. Subsequently, the execution information of the data write-back task write3 is added to the task queue. The data write-back task write3 is used for transmitting the processed data data3' from the block3 of the internal memory to the external memory 200. In this way, after completing the execution of the data read task read6 of the processing module 6, the DMA proceeds to execute the data write-back task write3.

At the moment t7, the CPU completes the data processing step of the processing module 4, the processed data being denoted as data4'. Subsequently, the execution information of the data write-back task write4 is added to the task queue. The data write-back task write4 is used for transmitting the processed data data4' from the block4 of the internal memory to the external memory 200. In this way, after completing the execution of the data write-back task write3 of the processing module 3, the DMA proceeds to execute the data write-back task write4.

At the moment t8, the DMA completes the task read6, reading the data6 into the block2 of the internal memory.

At the moment t9, the DMA completes the task write3, the data data3' in the block3 of the internal memory is written back to the external memory 200, freeing up the storage space of the block3, with no data stored in the block3 (null) at this time.

At the moment t10, the CPU completes the data processing step of the processing module 5, the processed data being denoted as data5'. Subsequently, the execution information of the data write-back task write5 is added to the task queue. The data write-back task write5 is used for transmitting the processed data data5' from the block1 of the internal memory to the external memory 200. In this way, after completing the execution of the data write-back task write4 of the processing module 4, the DMA proceeds to execute the data write-back task write5.

At the moment t11, the DMA completes the task write4, the data data4' in the block4 of the internal memory is written back to the external memory 200, freeing up the storage space of the block4, with no data stored in the block4 (null) at this time.

At the moment t12, the CPU completes the data processing step of the processing module 6, the processed data being denoted as data6'. Subsequently, the execution information of the data write-back task write6 is added to the task queue. The data write-back task write6 is used for transmitting the processed data data6' from the block2 of the internal memory to the external memory 200. In this way, after completing the execution of the data write-back task write5 of the processing module 5, the DMA proceeds to execute the data write-back task write6.

At the moment t13, the DMA completes the tasks writes and write6, the data data5' and data6' in the block1 and block2 of the internal memory is written back to the external memory 200, freeing up the storage spaces of the block1, block2, with no data stored in the block1 to the block4 (null) at this time.

In the embodiment of FIG. 12, the internal memory and the external memory are adopted to jointly store the corresponding data of the processing modules. Four storage sub space blocks are used in the internal memory to store the corresponding data of all processing modules, saving (6−4)/6=1/3 storage space compared to using 6 storage sub space blocks to store the data of all processing modules.

And, based on the data transmission scheme of the present invention, the CPU adds execution information of each data transmission task to the task queue in advance, so that the DMA is able to continuously execute the data read/write-back tasks, improving the utilization of the DMA. This allows the data transmission to be completed as early as possible, thereby preparing the data required by the CPU in advance, so that the CPU is able to continuously execute the data processing steps of the processing modules, without the need to wait for the DMA to complete the data transmission, avoiding the waste of computing resources of the CPU.

Thus, based on the data transmission scheme of the present invention, high efficient data transmission between the external memory and the internal memory may be achieved, saving the storage space of the internal memory on the premise that the computing efficiencies of the processor and the hardware acceleration unit are not affected (the processor and the hardware acceleration unit may still be able to work continuously, without wasting time waiting for the completion of the data transmission task).

In the above embodiment, the forward computation process of the speech recognition model is executed by the CPU. In another embodiment, the forward computation process of the speech recognition model is executed by the hardware acceleration unit 140 controlled by the CPU. The hardware acceleration unit 140 is a dedicated integrated circuit for performing neural network computation, thereby further speeding up speech recognition. In this embodiment, the CPU maintains a task queue, adds data transmission tasks such as read1 and read2 to the task queue on suitable occasions, so that the DMA executes the data transmission tasks in turn according to the sequence in the task queue. After the data required by a particular processing module of the speech recognition model is read into the internal memory, the CPU sends a control instruction to the hardware acceleration unit 140. Based on the control instruction, the hardware acceleration unit 140 reads the corresponding data from the internal memory and executes the data processing step of the processing module. After the processing is completed, the hardware acceleration unit 140 writes the processed data back to the corresponding location in the internal memory, and informs the CPU the completion of the processing by way of an interrupt. In response to the interrupt, the CPU adds a next (or next several) data transmission task(s) to the task queue, and repeats the above process, until the speech recognition process ends, obtaining the speech recognition result.

Figure 13:
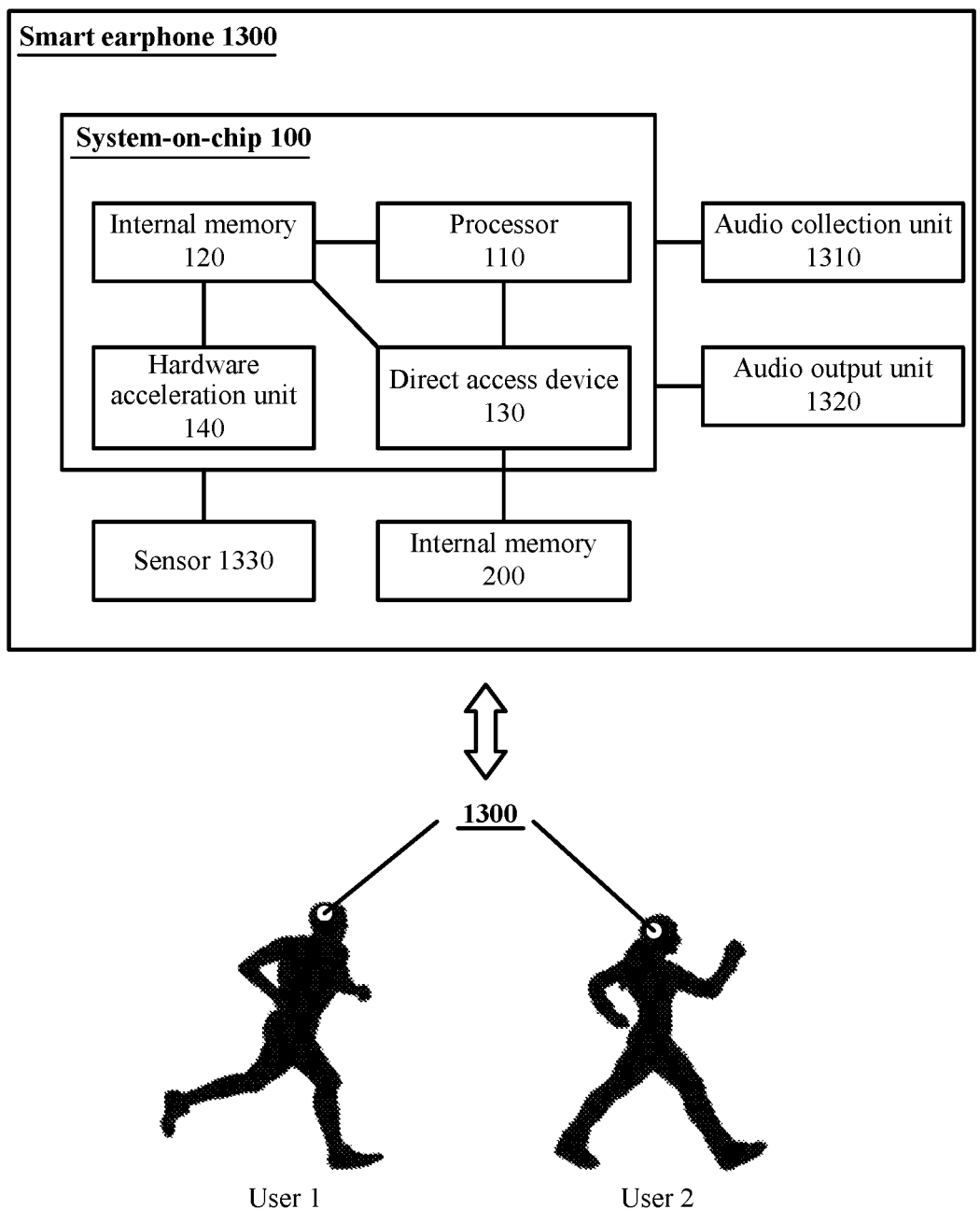
FIG. 13 illustrates a schematic diagram of a system-on-chip 100 of the present invention being applied to a smart earphone scenario.

FIG. 13 illustrates a schematic diagram of a system-on-chip 100 of the present invention being applied to a smart earphone scenario. As shown in FIG. 13, the smart earphone 1300 includes the system-on-chip 100 of the present invention and an external memory 200, an audio collection unit 1310, and an audio output unit 1320 that are coupled to the system-on-chip 100. The external memory 200, the audio collection unit 1310, and the audio output unit 1320 may be coupled to the system-on-chip 100 via, for example, an I/O interface provided on the system-on-chip 100, and perform data exchange with the related processing units inside the system-on-chip 100.

Similar to the smart speaker scenarios shown in FIG. 11 and FIG. 12, the smart earphone shown in FIG. 13 may also provide speech interaction with a user. The audio collection unit 1310 in FIG. 13 is used for collecting a speech signal from the user, and the processor 110 performs the processing of pre-emphasizing and framing on the speech signal, performs windowing on each frame, computes the frequency spectrum of each frame, and determines the speech features of each frame according to the frequency spectrum. Subsequently, the processor 110 or a hardware acceleration unit 140 performs the forward computation process of a speech recognition model, determines the textual content corresponding to the speech signal, thereby identifying the user's intention, and outputting corresponding speech feedback to the user through the audio output unit 1320.

In the course of the processor 110 or the hardware acceleration unit 140 performing the forward computation process of the speech recognition model, the data transmission of the present invention may be adopted to store the timing feature information into the external memory 200, add a transmission task of the timing feature information to a task queue, if desired, so that a direct access device 130 asynchronously reads the timing feature information from the external memory 200 into the internal memory 120, and writes the processing result of the timing feature information from the internal memory 120 back to the external memory 200. While the direct access device 130 is performing data transmission, the processor 110 may perform computation processing based on the existing data in the internal memory 120. The data transmission scheme of the present invention improves the utilization of the direct access device 130 by setting the task queue, and minimizing or even eliminating the waiting time of the processor 110. On the premise that the computing efficiency of the processor 110 is not affected, a large amount of timing feature information is stored into the external memory 200, saving the storage space of the internal memory 120. For the specific process of data transmission, refer to the foregoing FIG. 12. Details are not described herein again.

In an embodiment, the smart earphone 1300 also includes a sensor 1330. The sensor 1330 may for example be an accelerometer sensor, a gyroscope or the like, used for collecting current movement status information of the smart earphone 1300. The movement status information collected by the sensor 1330 is stored into the external memory 200. Subsequently, the processor 110 inputs the movement status information by batch into a preset behavior recognition model. The model performs forward computation on the movement status information, outputs a user' behavior corresponding to the movement status information, for example, behaviors such as being static, walking, running, riding bicycle, traveling by vehicle, and further issues a health prompting speech to the user or makes information recommendation according to the user behavior.

In the course of performing the forward computation process of the speech recognition model by using the behavior recognition model, the data transmission scheme of the present invention may be adopted to store the movement status information into the external memory 200. The processor 110 adds a data read task for the movement status information to the task queue, if desired, so that the direct access device 130 asynchronously reads the movement status information from the external memory 200 into the internal memory 120. The processor 110 or the hardware acceleration unit 140 reads and processes the data in the internal memory 120, and writes the processed data back to the internal memory. After the processor 110 or the hardware acceleration unit writes the data processing result back to the internal memory, the processor 110 adds a write-back task for the data processing result to the task queue, so that the direct access device 130 asynchronously writes the processing result from the internal memory 120 back to the external memory 200.

Thus, based on the data transmission scheme of the present invention, high efficient data transmission between the external memory and the internal memory may be achieved, minimizing or even eliminating the waiting time by the processor and the hardware acceleration unit. On the premise that the computing efficiencies of the processor and the hardware acceleration unit are not affected, the storage space of the internal memory is saved.

The various technologies described herein may be implemented with hardware or software, or a combination of both. Thus, the method and device of the present invention, or some aspects or parts of the method and device of the present invention, may take the form of program code (that is, instructions) embedded in a tangible medium, for example, a removable hard disk, a USB drive, a floppy disk, a CD-ROM, or any other machine-readable storage media. When the program is loaded into and executed by a machine, such as a computer, the machine becomes a device practicing the present invention.

Where the program code is executed on a programmable computer, the computing device generally includes a processor, a processor-readable storage medium (including volatile and nonvolatile memories and/or storage elements), at least one input device, and at least one output device. The memory is configured to store the program code; the processor is configured to execute the data transmission method of the present invention according to the instructions in the program code stored in the memory.

By way of example, and not limitation, readable media include readable storage media and communication media. A readable storage medium stores information such as computer-readable instructions, data structures, program modules, or other data. A communication medium typically embodies computer-readable instructions, data structures, program modules, or other data with a modulated data signal such as a carrier wave or other transmission mechanism, and includes any information delivery media. Combinations of any of the above are also included within the scope of readable media.

In the description provided herein, the algorithms and displays are not inherently related to any particular computer, virtual system, or other devices. Various general-purpose systems may also be used with the examples of the present invention. From the above description, the structure required to construct such a system is obvious. Furthermore, the invention is not directed to any particular programming language. It should be understood that various programming languages may be used to implement the content of the present invention described herein, and the above description of specific languages is to disclose the best embodiment of the present invention.

In the specifications provided herein, numerous specific details are explained. It is understood, however, that embodiments of the invention may be practiced without these specific details. In some instances, well-known methods, structures, and techniques have not been shown in detail so as not to obscure the understanding of the specification.

Similarly, it should be understood that, for the purpose of streamlining the present disclosure and aiding in the understanding of one or more of the various aspects of the invention, in the foregoing description of exemplary embodiments of the present invention, various features of the present invention are sometimes grouped together into a single embodiment, drawing, or description thereof. However, the disclosed method is not to be interpreted as reflecting an intention that the claimed invention requires more features than those expressly recited in each claim.

Rather, as the following claims reflect, inventive aspects lie in less than all features of a single embodiment disclosed above. Therefore, the claims following the detailed description are hereby expressly incorporated into this detailed description, with each claim standing on its own as a separate embodiment of the present invention.

Those skilled in the art should understand that the modules, units or components of the devices in the examples disclosed herein may be arranged in the devices described in the embodiments, or alternatively located in one or more devices different from the devices in the examples. The modules described in the foregoing examples may be combined into one module or may be divided into a plurality of submodules.

Those skilled in the art can understand that the modules in the devices in the embodiments may be adaptively changed and provided in one or more devices different from the devices in the embodiments. The modules, units or components in the embodiments may be combined into one module, unit or component, and in addition, they may be divided into a plurality of submodules, subunits, or subcomponents. All features disclosed in the description (including the accompanying claims, abstract and drawings), and all processes or units of any methods or devices so disclosed, may be combined in any way, except that at least some of such features and/or processes or units are mutually exclusive. Unless otherwise clearly stated, each feature disclosed in the description (including the accompanying claims, abstract and drawings) may be replaced by alternative features serving the same, equivalent or similar purpose.

In addition, those skilled in the art can understand that, although some of the embodiments described herein include some but not other features included in other embodiments, combinations of features of different embodiments are meant to be within the scope of the present invention and form different embodiments. For example, in the following claims, any one of the claimed embodiments may be used in any combination In addition, some of the embodiments are described herein as a combination of methods or method elements that can be implemented by a processor of a computer system or by other devices that execute the functions. Therefore, a processor having necessary instructions for implementing the methods or method elements forms a device for implementing the methods or method elements. In addition, the elements described in the device embodiments are examples of devices for implementing functions executed by elements for the purpose of implementing the present invention.

As used herein, unless otherwise specified, the use of ordinals "first", "second", "third", and the like to describe general objects merely represents different instances involving similar objects, and is not intended to imply that objects so described must have a given order in time, space, sorting or any other aspects.

Although the present invention has been described according to a limited quantity of embodiments, benefiting from the foregoing description, those skilled in the art can understand that other embodiments may be conceived of within the scope of the present invention described thereby. In addition, it should be noted that the language used in the specification is mainly selected for readability and teaching purposes, rather than for interpreting or defining the subject of the present invention. Therefore, many modifications and variations made without departing from the scope and spirit of the appended claims are apparent to persons of ordinary skill in the art. In regard to the scope of the present invention, the disclosure of the present invention is illustrative and not restrictive, and the scope of the present invention is defined by the appended claims.

What is claimed is:

1. A data transmission method, adapted for data transmission between an internal memory of a system-on-chip and an external memory coupled to the system-on-chip, wherein the method is executed by a processor of the system-on-chip, and comprises steps of:
    adding execution information of at least one data transmission task to be executed to a task queue;
    sending execution information of a data transmission task in the task queue to a direct access device for the direct access device to execute the data transmission task, wherein the execution information is written to a configuration register of the direct access device; and
    receiving an interrupt request sent by the direct access device, the interrupt request being adapted to indicate completion of the execution of the data transmission task, wherein the processor, in response to the interrupt request, sends execution information of a next data transmission task to be executed in the task queue to the direct access device.

2. The method according to claim 1, wherein the system-on-chip further comprises a hardware acceleration unit, the hardware acceleration unit being coupled to the internal memory; and
    wherein the data transmission task comprises:
    transmitting data in the external memory to the internal memory, so that the hardware acceleration unit fetches and processes the data; and
    transmitting the processed data from the internal memory to the external memory after the hardware acceleration unit has processed the data.

3. The method according to claim 1, wherein the execution information comprises a source starting address, a destination starting address, and a data size of the data transmission.

4. The method according to claim 1, wherein the task queue is a linked list structure, and the step of adding the execution information of the at least one data transmission task to be executed to the task queue comprises:
    adding the execution information of the at least one data transmission task to be executed to a tail of the linked list structure.

5. The method according to claim 1, wherein the task queue further comprises a status flag of each data transmission task, the status flag comprising not-executed, being-executed, and executed, and wherein the method further comprises:
    setting the status flag of the data transmission task to not-executed after adding execution information of the data transmission task to be executed to the task queue;
    setting the status flag of the data transmission task to being-executed after sending the execution information of the data transmission task to the direct access device; and
    setting the status flag of the data transmission task to executed after receiving the interrupt request sent from the direct access device for indicating completion of the execution of the data transmission task.

6. The method according to claim 5, further comprising a step of: determining whether data in a destination address of the data transmission task is available based on the status flag of the data transmission task.

7. The method according to claim 1, wherein the task queue further comprises post-work information of each data transmission task, the post-work information comprising operations required to be executed after completion of the execution of the data transmission task; and after the step of receiving the interrupt request sent from the direct access device, the method further comprises a step of: executing the post-work information of a respective data transmission task.

8. The method according to claim 7, wherein the post-work information comprises at least one of the following:

freeing storage space in a source address, verifying whether data written to a destination address is correct, and verifying whether the direct access device has correctly executed the data transmission task.

9. A data transmission device residing in an internal memory of a system-on-chip, adapted for data transmission between the internal memory and an external memory coupled to the system-on-chip, wherein the data transmission device comprises:

a task adding module adapted to add execution information of at least one data transmission task to be executed to a task queue;

a task registration module adapted to send execution information of a data transmission task in the task queue to a direct access device for the direct access device to execute the data transmission task, wherein the execution information is written to a configuration register of the direct access device; and a request response module adapted to receive an interrupt request sent by the direct access device, wherein the interrupt request is used to indicate completion of the execution of the data transmission task; and call the task registration module in response to the interrupt request, so that the task registration module sends execution information of a next data transmission task to be executed in the task queue to the direct access device.

10. The data transmission device of claim 9, wherein the data transmission task comprises:

transmitting data in the external memory to the internal memory, so that a hardware acceleration unit fetches and processes the data; and transmitting the processed data from the internal memory to the external memory after the hardware acceleration unit has processed the data.

11. The data transmission device of claim 9, wherein adding the execution information of the at least one data transmission task to be executed to the task queue comprises:

adding the execution information of the data transmission task to be executed to a tail of a linked list structure.

12. A system-on-chip comprising a processor, an internal memory, and a direct access device, the system-on-chip being coupled to an external memory, wherein the processor is adapted to add execution information of at least one data transmission task to be executed to a task queue, and send execution information of a data transmission task in the task queue to the direct access device, wherein the execution information is written to a configuration register of the direct access device, and wherein the data transmission task is adapted to implement data transmission between the internal memory and the external memory;

the direct access device is adapted to execute the data transmission task according to the received execution information, and send an interrupt request to the processor after completion of the execution of the data transmission task; and the processor sends execution information of a next data transmission task in the task queue to the direct access device in response to the interrupt request.

13. The system-on-chip according to claim 12, further comprising a hardware acceleration unit coupled to the internal memory, wherein the data transmission task comprises:

transmitting data in the external memory to the internal memory, so that the hardware acceleration unit fetches and processes the data; and transmitting the processed data from the internal memory to the external memory after the hardware acceleration unit has processed the data.

14. The system-on-chip according to claim 12, wherein the execution information comprises a source starting address, a destination starting address, and a data size of the data transmission.

15. An intelligent device, comprising the system-on-chip according to claim 12.

* * * * *